United States Patent

Tsugami

[15] 3,701,110

[45] Oct. 24, 1972

[54] APPARATUS FOR PRODUCING A PUNCHED TAPE RECORD FOR RECORDING WORKING CONDITIONS OF MACHINE TOOLS

[72] Inventor: Taisuke Tsugami, No. 415, 1-chome, Shimo-Ochiai, Shinjuku-ku, Tokyo, Japan

[22] Filed: Nov. 18, 1970

[21] Appl. No.: 90,668

[30] Foreign Application Priority Data

Nov. 22, 1969 Japan ......................44/93371

[52] U.S. Cl. ...............................................340/172.5

[51] Int. Cl. ............................G01d 9/00, G06k 1/00

[58] Field of Search ...............340/172.5; 346/33 MC

[56] References Cited

UNITED STATES PATENTS

| | | |
|---|---|---|
| 3,099,512 | 7/1963 | Kohler ................340/172.5 X |
| 3,268,870 | 8/1966 | Chalker, Jr. et al....340/172.5 |
| 3,295,108 | 12/1966 | Harris et al............340/172.5 |
| 3,296,596 | 1/1967 | Yagusic et al. .........340/172.5 |
| 3,322,940 | 5/1967 | Barker et al. ........340/172.5 X |
| 3,512,139 | 5/1970 | Reynolds, Jr. et al..340/172.5 |
| 3,588,832 | 6/1971 | Duncan ..................340/172.5 |

*Primary Examiner*—Paul J. Henon
*Assistant Examiner*—Melvin B. Chapnick
*Attorney*—Mason, Fenwick & Lawrence

[57] ABSTRACT

Apparatus for producing a punched tape record for recording working conditions of machine tools, to be supplied to an electronic computer for automatically computing information representing working efficiency. The apparatus comprises a time code generator for producing binary coded time data, first and second memory devices, one for each machine took, gating means for transferring in response to selected pulses the binary coded time data and the memory contents of the first memory devices into the second memory devices, and means for sequentially scanning the memory contents of the second memory devices and activating a punch device to punch the memory contents of the second memory devices into a tape.

1 Claim, 11 Drawing Figures

INVENTOR
TAISUKE TSUGAMI
BY
Mason, Fenwick & Lawrence
ATTORNEYS

INVENTOR
TAISUKE TSUGAMI
BY
Mason, Fenwick & Lawrence
ATTORNEYS

INVENTOR
TAISUKE TSUGAMI
BY
Mason, Fenwick & Lawrence
ATTORNEYS

INVENTOR

TAISUKE TSUGAMI

BY
Mason, Fenwick & Lawrence
ATTORNEYS

INVENTOR

TAISUKE TSUGAMI

BY

Mason, Fenwick & Lawrence

ATTORNEYS

INVENTOR

TAISUKE TSUGAMI

BY

Mason, Fenwick & Lawrence
ATTORNEYS

INVENTOR
TAISUKE TSUGAMI
BY
Mason, Fenwick & Lawrence
ATTORNEYS

INVENTOR

TAISUKE TSUGAMI

BY
Mason, Fenwick & Lawrence
ATTORNEYS

INVENTOR

TAISUKE TSUGAMI

BY

Mason, Fenwick & Lawrence

ATTORNEYS

APPARATUS FOR PRODUCING A PUNCHED TAPE RECORD FOR RECORDING WORKING CONDITIONS OF MACHINE TOOLS

This invention relates to data processing systems and, in particular, concerns an automatic data processing system in which such production data as the machining or processing duration and the idle duration are automatically collected and recorded on a tape for an electronic computer, relative to machine tools or industrial production machines at work, the said tape being then supplied to the electronic computer which automatically computes with the supplied data according to a predetermined source program provided therein and thus yields the desired results of computation representing the working efficiency, that is, the ratio of effective operating time to total service time, and such data as the machining or processing cost and the like that are useful in controlling the machining or production activities. The idle duration mentioned above covers lost time arising from the delay in material or work supply, the switching of the cutting tool from one kind to another, the setting up or positioning of the material or work in place, etc.

For determining the working efficiency of a general or numerically controlled machine tool, for example, as well as the machining time, the operating efficiency of the machinist, etc., it has heretofore been common practice to collect all basic data from the machine at work, punch the collected data into cards or tape according to the patterns intelligible only to a computer, and then feed the punched cards or tape into the computer, all by humans, to obtain the desired information.

In other words, according to the method heretofore used, the machining time would be clocked by the machinist, and this is effected by stamping on the job sheet the hour of commencing a machining operation and, upon completion of the operation, stamps again on the sheet.

Such a method, however, does not ensure accurate recording of the idle time associated with the delay in the supply of work pieces, the changing of the cutting tool and the setting up or positioning of the material or work in the machine tool, and therefore does not always reveal the true machining cost.

Such job sheets, each carrying basic data, would be gathered at the end of a certain interval of time by a person in charge, who would then sort the sheets and transfer the data to cards or to a tape by manual punching. The punched cards or tape would be subsequently fed into the electronic computer, to which a source program tape has been given in advance. Thereupon, the computer would read the data and compute to issue forth the working time or efficiency of the machine tool, the operating efficiency of the machinist, the machining cost and others for the said interval of time.

Data recording, collection, sorting, punching and all in the foregoing conventional method are purely manual steps. Thus, even a highly accurate and reliable computer used in the method is no guarantee for the accuracy of the results of computation, because such data handling is subject to all sorts of human error at each stage of data transition or manipulation and is liable to result in inaccurate data going into the computer.

To safeguard against the possibility of such errors, it has been customary in the conventional method to check all punched cards or tapes, prior to feeding them to the computer, by passing them through a verifying device or by visually tallying each against its original job sheet.

Note should be taken of the fact the machinist's stamping on the job sheet to indicate the work identification and machining time data thereon is a time consuming step, which adds to the various handling steps mentioned above.

The object of this invention is to overcome the drawbacks of the foregoing conventional method. The distinction of this invention lies in that it accomplishes it object by using electrical signals to collect from a plurality of such as machine tools being operated respectively and concurrently the time data representing the commencement and completion of each machining operation and to punch the collected data directly into a tape, all automatically and in the manner to be hereunder described in reference to the attached drawings, in which.

FIGS. 8 through 11 each show an example of the punch tape carrying the data punched according to this invention.

Figure 1:
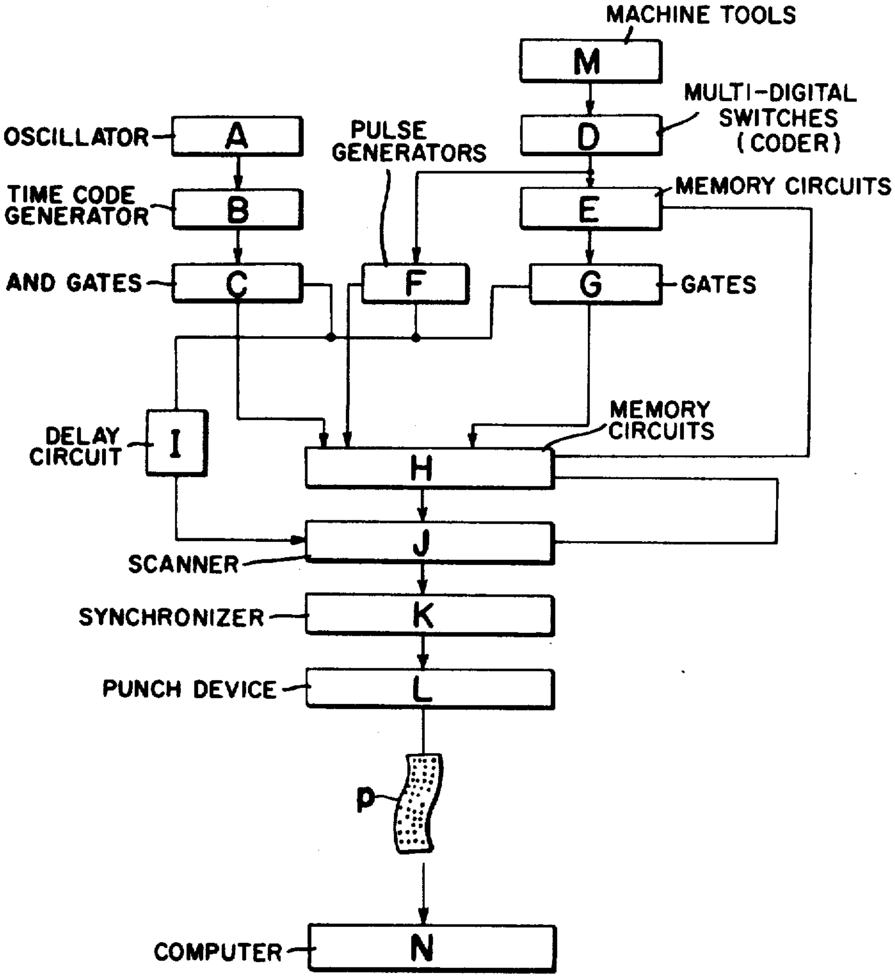
FIG. 1 is a block diagram showing a system of this invention as applied to a general-type machine tool or industrial production machine.
Figure 2:
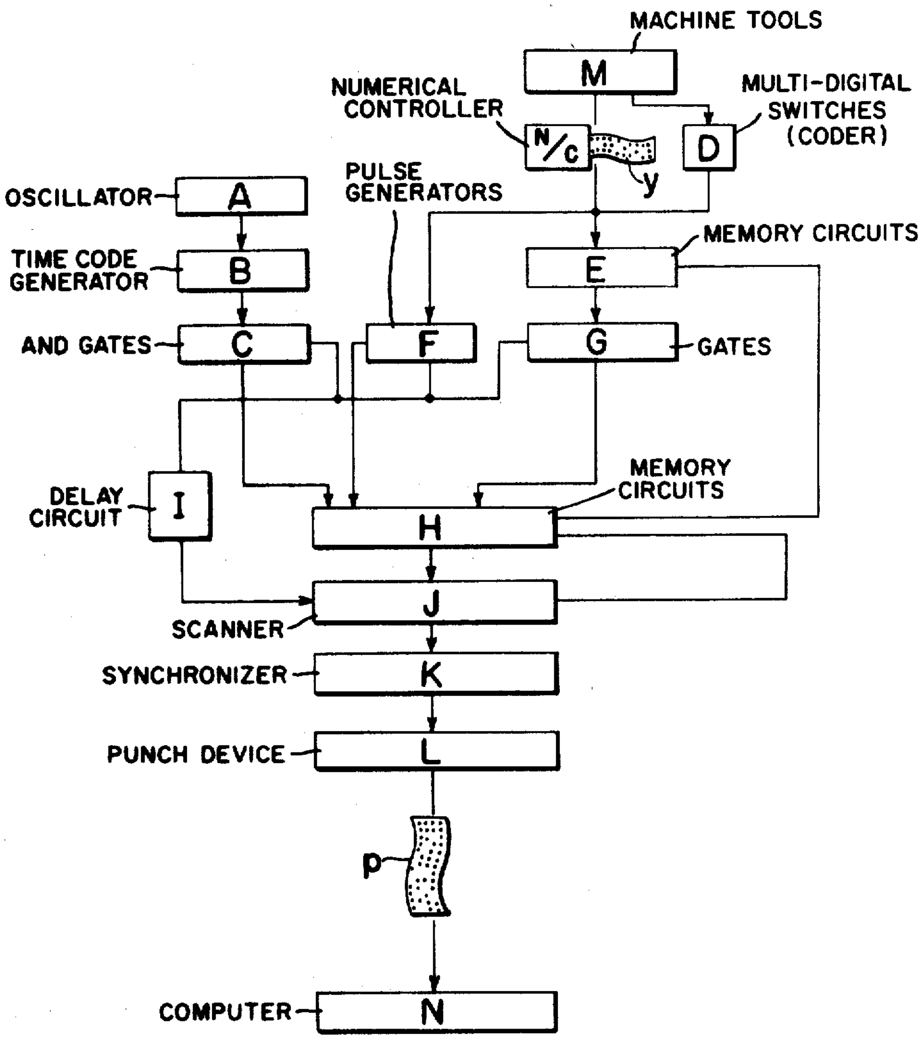
FIG. 2 is another block diagram showing a system of this invention as applied to a numerically controlled machine tool.
Figure 3:
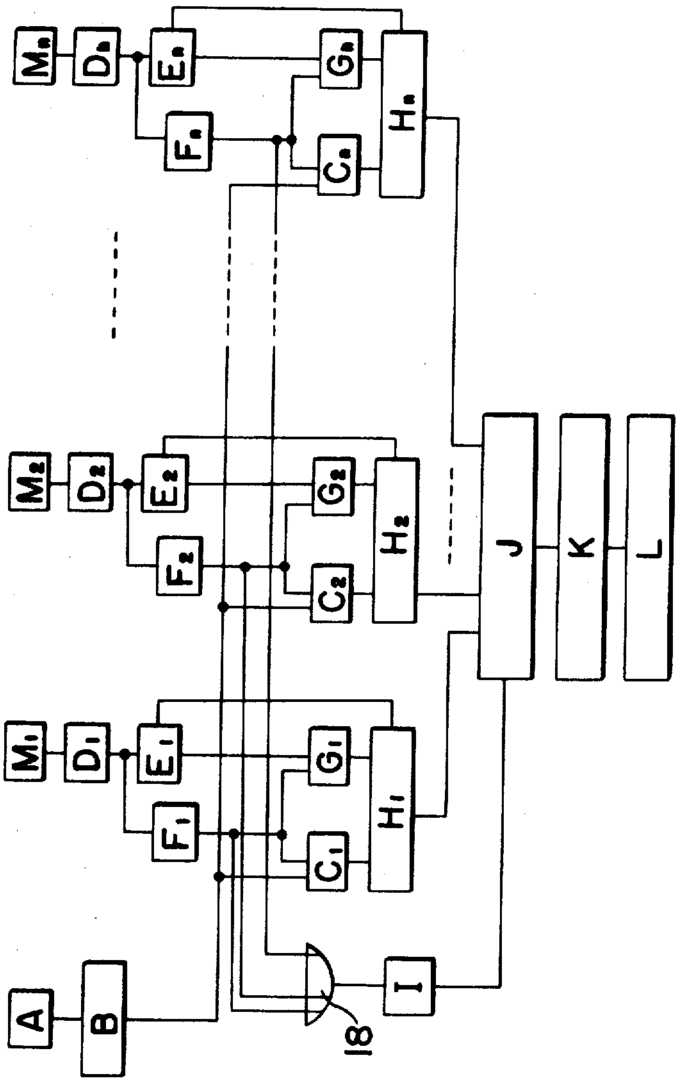
FIG. 3 is still another block diagram showing the system of FIGS. 1 and 2, as applied to a plurality of machine tools or industrial production machines.

Referring to FIGS. 1, 2 and 3, A is an oscillator generating clock pulses at a rate of one pulse a second; and B is a time code generator producing B.C.D.(binary-coded decimal) time codes by means of the clock pulses received from said oscillator. In this coding, the date code is formed with six bits, the hour code with six bits, the minute code with seven bits, and the second code with seven bits, thus there being a total of 26 bits for the time data coding. Each bit is represented by an RS flip-flop taking two alternate states, "set" and "reset," in the known manner. C represents a series of AND gate circuits C1, C2, . . . C*n*. D represents a series of multi-digital switches serving as code-forming circuits D1, D2, . . . D*n* for producing codes that identify respective pieces of work to be machined. E represents a series of RS flip-flop memory circuits E1,E2, . . . E*n* for storing B.C.D. codes signifying the machine identification numbers, part type numbers and causes of idling. F represents a series of gate-control pulse generators F1, F2, . . . F*n*, which issue square-wave pulses to indicate the commencement and completion of each machining cycle and also the beginning and ending of each cause of idling. These square-wave pulses are transmitted to said gates C and to gates G, memory circuit H and delay circuit I, of which mention will be made next.

G represents a series of AND gate circuits G1, G2, . . . G*n*, similar to those of C above. H represents a series of memory circuits H1, H2, . . . H*n*, each composed of RS flip-flops similar to those of E above, for storing the time codes originating in said time code generator B and also the codes for machine numbers, part type numbers and causes of idling, as well as the signals for discriminating between the commencement and the completion of a machining operation and between the beginning and the ending of a cause of idling. M represents a series of machine tools M1, M2, . . . M*n*.

Thus, the above-mentioned AND gate circuits C, code-forming circuits D for work identification, memory circuits E, gate-control pulse generators F, gates G, memory circuits H and machine tools M are each composed of a group, whose members are indicated in the drawing as C1, C2, . . . C*n*; D1, D2, . . . D*n*; E1, E2, . . . E*n*; F1, F2, . . . F*n*; G1, G2, . . . G*n*; H1, H2, . . . H*n*: and M1, M2, . . . M*n*, all arranged in such a way that any one member in one group corresponds to the members with like subscript numbers in the other groups.

I represents a delay circuit, delaying the gate-control pulses generated by said pulse generators F. The amount of delay is determined by the values of resistance and capacitance. J represents a scanner, which sequentially scans the data stored in said memory circuits H, one word at a time. K represents a synchronizer, which controls the flow of electrical signals from above-named devices into the punch device L. The punch L converts the input signals into punched holes in the tape, thereby transforming the data into codes intelligible to the electronic computer N. The punched holes are indicated as P in the drawing. The computer N reads the punched codes off the tape, processes the data according to the source program, and then turns out numerical results of computation, which are the desired information.

The invention will be more fully described in reference to the embodiment thereof, wherein oscillator A issues forth clock pulses at a rate of one pulse a second and feeds them to time code generator B. The RS flip-flops of generator B count the pulses to produce parallel B.C.D. time code signals. These signals apply in parallel to the inputs of AND gates C—1 through C—26.

Daily work in a machine shop, for instance, generally starts at a certain hour of the day, say, at 8 a.m., which will be held as the reference point in time for the present system. The reference point may be taken at any other hour of the day. After setting the reference point, the parallel B.C.D. time code signals apply intermittently to said inputs of AND gates C. Provision of a monitoring station, for indicating the clock time digitally in the operators' or machinists' view, will be helpful, for such a station enables the operator or machinist to set the reference point more readily for his use.

Figure 4:
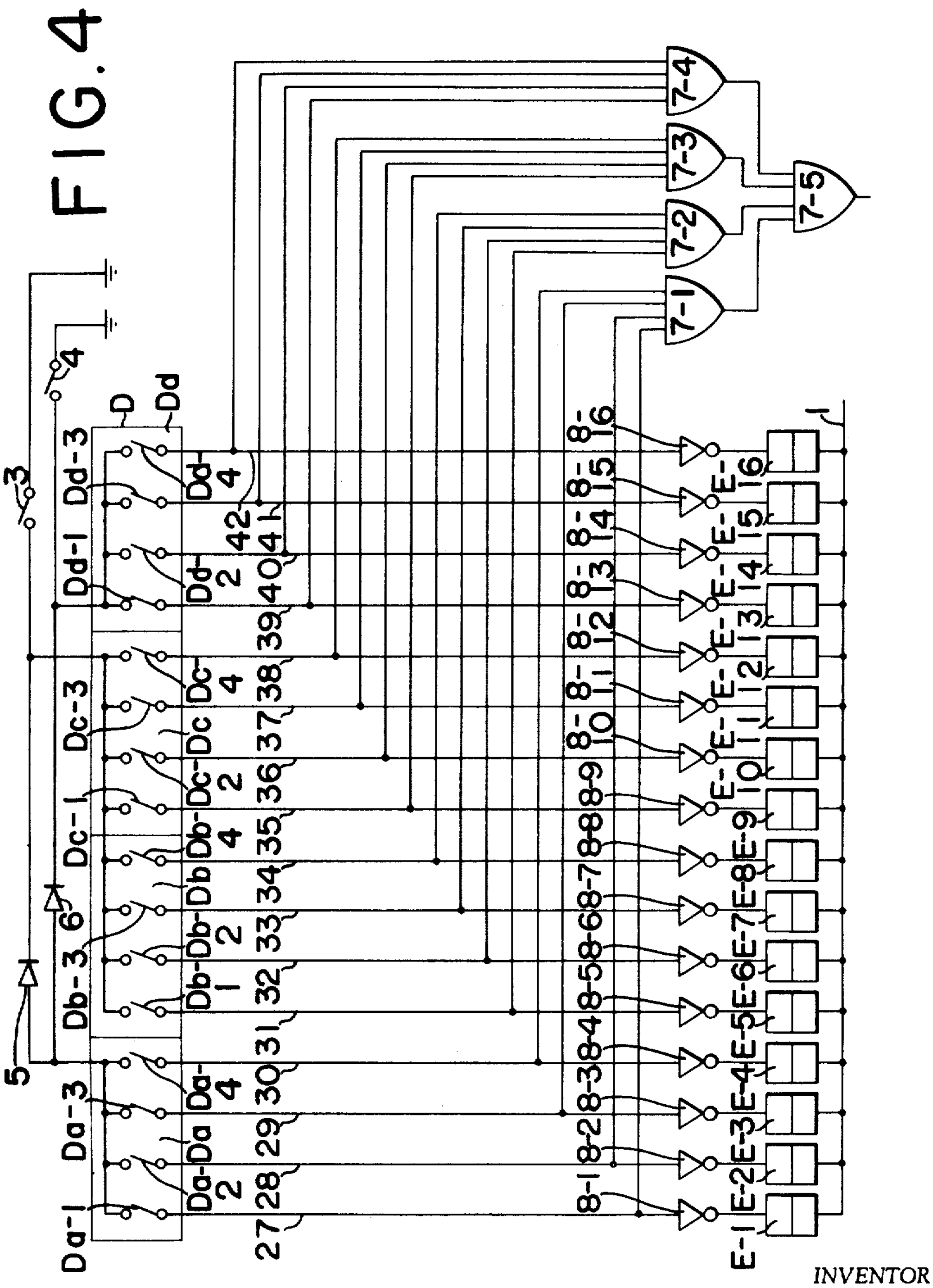
FIG. 4 is a line diagram showing the relationship among the machining switch, the stopping switch, the work-data generator and the memory circuits.

Referring to FIG. 4, it will be assumed that a certain machine tool M is to perform certain work. The work is to be coded by the coder D comprising multi-digital switches D*a*, D*b*, D*c* and D*d*, which are operated by a machine operator. Note that each switch is arranged to constitute a means of basic 8—4—2—1 binary coding of the decimal digits, so that the signals issuing from these switches can be directly used to control the operation of memory and output circuits. Stated specifically, contacts D*a*–1, D*b*–1, D*c*–1 and D*d*–1 are each for the weight of "1" in the four-bit binary coding of the decimal digits. Similarly, contacts D*a*–2, D*b*–2, D*c*–2 and D*d*–2 are each for the weight of "2", contacts D*a*–3, D*b*–3, D*c*–3 and D*d*–3 are each for the weight of "4" and contacts D*a*–4, D*b*–4, D*c*–4 and D*d*–4 are each for the weight of "8." One binary bit is represented by one contact. Thus, each switch with its four contacts can signify any decimal digit up to digit 9, according to the 8–4–2–1 binary coding scheme.

In the present instance, multi-digital switch D*a* is used to indicate any one of nine machine tools, No. 1 through No. 9. Switches D*b* and D*c* are used together to indicate the two-digit part type number, there being such numbers up to 99. Switch D*d* is used to indicate the cause of idling by a one-digit number, there being nine distinct causes numbered 1 through 9. It will be readily seen that, where there are more machine tools, more types of work to be out or more causes of idling, the number of multi-digit switches must be increased accordingly to cover the excess. As shown in FIG. 4, the output terminals of the contacts of switches D*a*, D*b*, D*c* and D*d* are connected to the inputs of AND gates 7–1 through 7–5 (hereafter referred to collectively as AND-type network gate 7) and, via inverters 8–1 through 8–16, to the "set" inputs of RS flip-flops E–1 through E–16 in memory E, thus paralleling AND-type network gate 7 to memory E. Note that the contacts of switch D*a* are connected to AND gate 7–1, those of switch D*b* to gate 7–2 and so on.

RS flip-flops E-1 through E–4 store the machine tool number code; E–5 through E–12 store the part type number code; and E–13 through E–16 store the cause-of-idling code. All codes are here B.C.D. codes. As in the case of multi-digit switches above, the number of flip-flops must be increased if more machine tools, more types of work to be cut or more causes of idling have to be handled. Said AND-type network gate 7 has +5 volts applied for its +Vcc. Memory flip-flops E–1 through E–16 have their "set" inputs at lower potential or level because of inverters 8–1 through 8–16, so that these flip-flops are normally in the state not retaining the data.

In the foregoing description, it will be seen that the work coder D is related to memory E. How the data are coded and transmitted will be explained by assuming that No. 8 machine tool is to cut work whose part type number is assumed to be 32. It may be in order here to clarify the meaning of the part type number. Different types of work, each differing in shape, size or some other respect from the other, are assigned to the machine tools under consideration. The types are identified by numbers, which are called the part type numbers. Referring again to FIG. 4, note the No. 8 machine tool and part type number 32 will be indicated in coder D by closure of contacts Da–4, Db–1 and Db–2 and Dc–2 in switches Da, Db and Dc.

Closing the machining switch 3 under this condition lowers the high-potential +5 volts applying to AND-type network gate 7. Stated specifically, this voltage becomes shorted to ground through conductor wires 30, 31, 32 and 36, said contacts Da–4, Db–1, Db–2 and Dc–2, diode 5 and said switch 3. Consequently, the potential of these conductors falls, so that, because of inverters 8–4, 8–5, 8–6 and 8–10, the potential of the "-set" inputs of RS flip-flops E–4, E–5, E–6 and E–10 rises to high level, causing steady high-level signals to emerge from the "set" outputs of these RS flip-flops.

The "set" outputs of the other RS flip-flops than those mentioned just above in memory E remain unaffected and provide the same steady low-level signals as before, because the multi-digit switch contacts connected to these flip-flops through inverters remain open.

The foregoing is the manner of storing the data in memory E. Coded data can be put into store in memory E by selectively switching the "set" sides of RS flip-flops E–1 through E–16 to high potential. "Set" sides at low potential mean that no coded data are held in store. This manner of data storing applies also to the RS flip-flops in memory H, which will be considered later.

Figure 5:
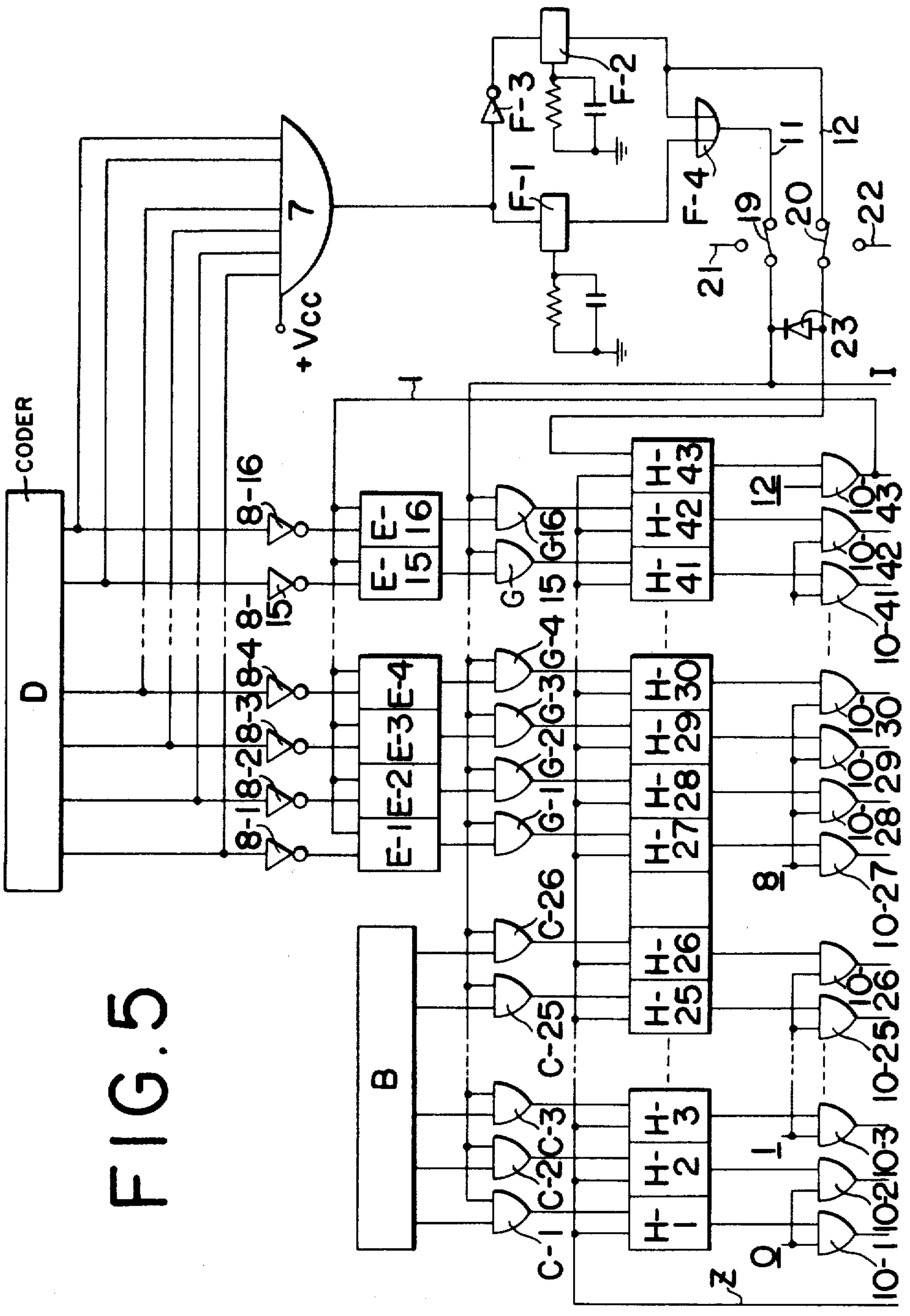
FIG. 5 is another line diagram showing the gate-control pulse generator, the gate circuits and the memory circuits.

Concurrent with the storing of coded data in memory E, the +5 volts on AND-type network gate 7 disappears through grounding, so that the output terminal of gate 7 changes from high to low level, thereby issuing a low-level signal from its output. Referring now to FIG. 5, this change in the output potential of gate 7 permits pulse P11 to be transmitted in parallel to the "1" input of gates C–1 through C–26 and gates C–1 through C–16 via OR circuit F–4, conductor wire 11 and closed contact 19. These gates have their "1" inputs connected to wire 11 and are parallel to one another. Pulse P11 emerges from one-shot vibrator F–1.

In FIG. 5, F–2 is a one-shot vibrator and F–3 an inverter. The two one-shot vibrators, F–1 and F–2, issue an output signal just when their respective input signals change from high level to low level. The width of this pulse is determined by the parallel circuit of a resistor and a capacitor connected to each vibrator.

When the output of AND-type network gate 7 changes from low to high level, on the other hand, the resultant signal goes to one-shot vibrator F–2 through inverter F–3 and triggers F–2 to operate, signifying the completion of the machining operation or the termination of the cause of idling, whichever is the case, as will be explained later. Since gates C–1 to C–26 and G–1 through G–16 are all AND type gates, said pulse P11 applying to these gates shifts the commencement-of-machining data in memory C and the data in memory E to memory H, so that RS flip-flops H–1 through H–26 take in the commencement-of-machining data, RS flip-flop H–30 takes in the machine tool number data, and RS flip-flops H–31, H–32 and H–36 take in the part type number data.

As a completion-of-machining pulse 12 applies to the "set" input side of RS flip-flop H–43, a high-level signal appears from its "set" output. At the time of commencing a machining operation, however, no positive pulse applies to this input, so that its "set" output remains at low level.

As has been described, memory H is composed of 43 RS flip-flops arranged to store the complete data for one machine tool in the form of 43 bits. These bits are designated as S1 through S43, one bit to one RS flip-flop in the configuration consisting of H–1 through H–43. It should be noted that, for the purpose of facilitating understanding, the bits are numbered in the same way as are the conductor wires through which the signals are transmitted. A bit signal entering a circuit element is an input signal, and that signal leaving an element is its output signal.

Figure 7:
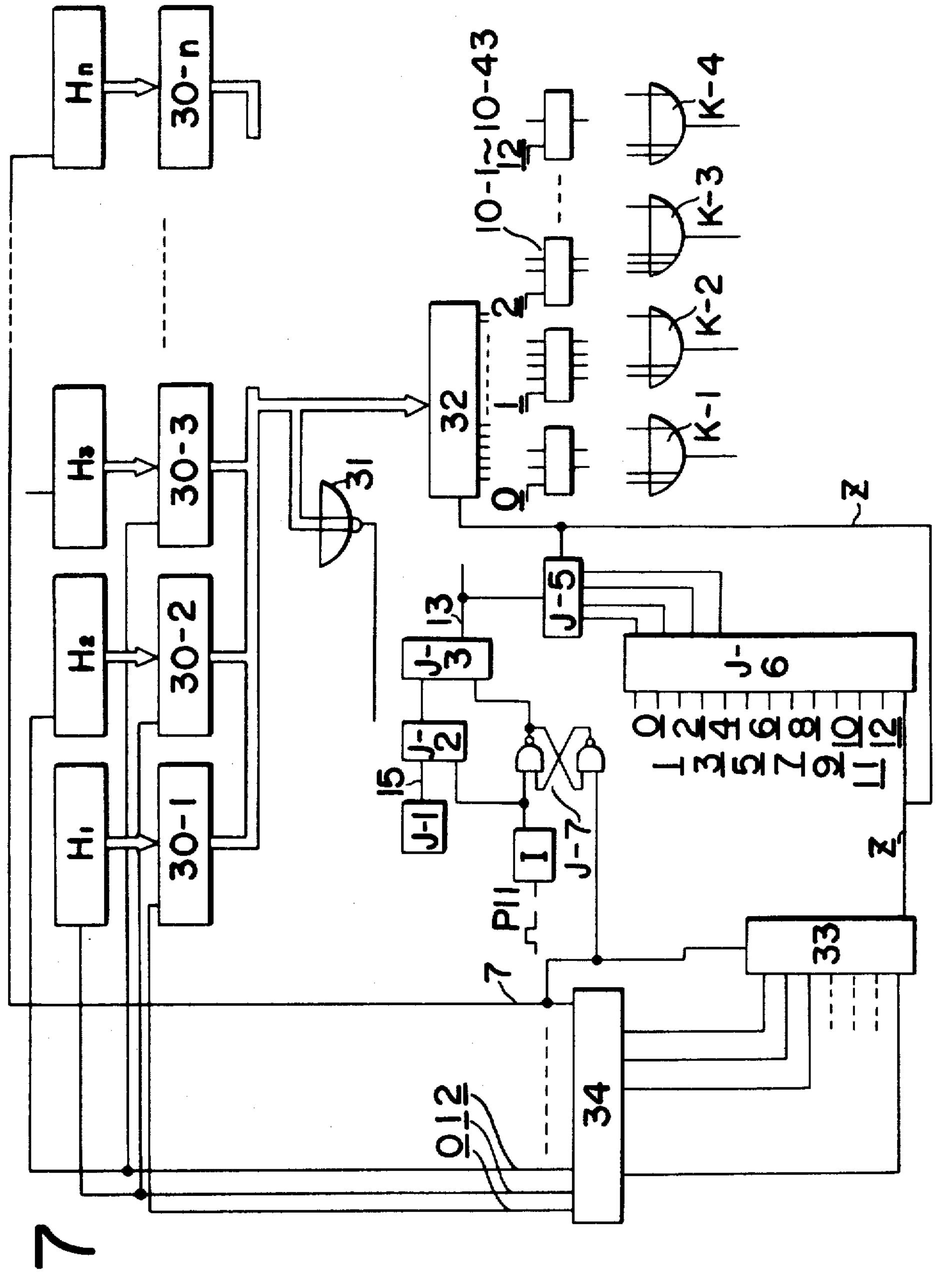
FIG. 7 is another block diagram showing the manner of scanning of FIG. 6, as applied to a system in which a plurality of machine tools or production machines are served, and indicating, in particular, the manner of sequentially scanning a plurality of memory circuits and of clearing these circuits by means of a clearing pulse.

It will be noted in FIGS. 3 and 7 that $n$ sets of memory circuits H are required for an $n$ number of machine tools. Where more part type numbers or more causes of idling are involved, the number of RS flip-flops must be increased correspondingly in memory E and memory H.

Figure 6:
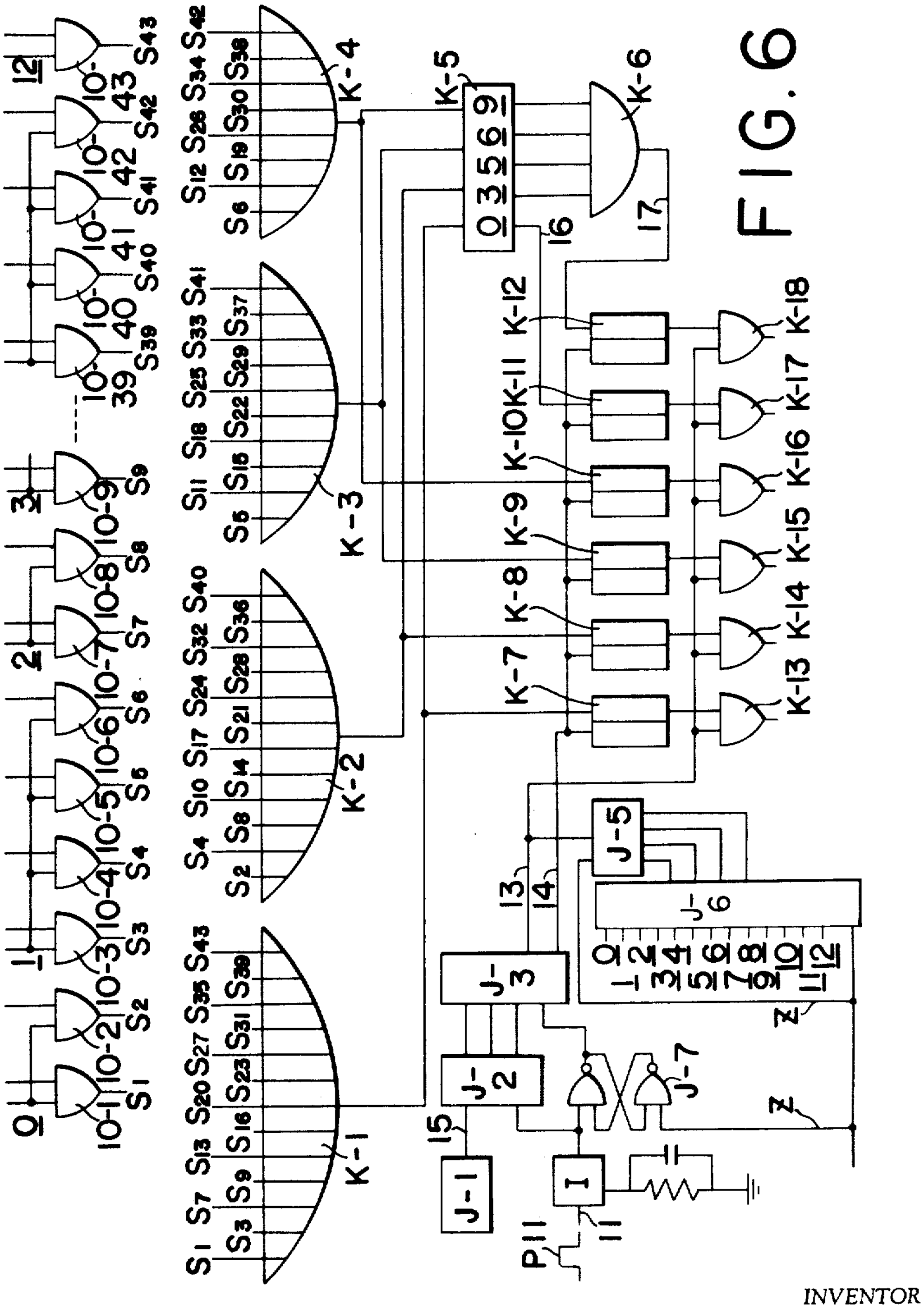
FIG. 6 is a block diagram illustrating the manner of scanning.

Output signals S1 through S43, emerging from RS flip-flops H–1 through H–43, apply to the "1" inputs of the two-input AND gates 10–1 through 10–43, as shown in FIG. 6, and the resultant output signals from these AND gates apply to multi-input OR gates K–1 through K–4. These OR gates are provided for the purpose of punching the coded data in an orderly sequential manner and, for that purpose, distribute the coded data represented by signals S1 through S43, according to the weights in the 8–4–2–1 binary coding scheme. In the arrangement shown, OR gate K–1, receiving output signals S1, S3, S7, S9, S13, S16, S20, S23, S27, S31, S35, S39 and S43 is for the weight of "1"; OR gate K–2, receiving signals S2, S4, S8, S10, S14, S17, S21, S24, S28, S32, S36 and S40, is for the weight of "2"; OR gate K–3, receiving signals S5, S11, S15, S18, S22, S25, S29, S33, S37 and S41, is for the weight of "4"; and OR gate K–4, receiving signals S6, S12, S19, S26, S30, S34, S38 and S42, is for the weight of "8." Thus, K–1 is a 13-input gate, K–2 a 12-input gate, K–3 a 10-input gate, and K–4 an 8-input gate.

The outputs of OR gates K–1 through K–4 are connected to the "set" inputs of RS flip-flops K–7 through K–10 on the one hand and to the inputs of decoder K–5 on the other hand. Said flip-flops K–7 through K–10 take in and hold the output signals from OR gates K–1 through K–4 in the form of B.C.D. (binary-coded decimal) digit codes based on the 8–4–2–1 scheme. Said decoder K–5 issues a high-level output signal P16 when there is no signal coming from any of OR gates K–1 through K–4. This high-level signal applies to the "set" input of RS flip-flop K–11 through conductor wire 16.

Another purpose of decoder K–5 is to provide a parity check for punch device L. It functions in this manner: Suppose the number of output signals coming from multi-input OR gates K–1 through K–4 is even (divisible by 2); then decoder K–5 will produce an additional signal, which is the high-level output signal 17 mentioned above, to make odd the total number of signals; and this signal 17 goes via OR gate K–6 to the "set" input of RS flip-flop K–12, causing this flip-flop to retain "1." Thus, while RS flip-flop K–11 takes in "1" when there is no signal from any of OR gates K–1 through K–4, RS flip-flop K–12, which is a parity-check element for punch device L, takes in "1" when the number of output signals from these OR gates is an even number. For example, for the binary-coded decimal digit "3," there will be two output signals, one from K–1 and one from K–2, so that "1" signal will enter K–11. An even number of signals occur also for the B.C.D. digits "5", "6" and "9." These digits, including "3," are indicated in the circuit symbol for K–5 in FIG. 6.

It was stated previously that, at the time of starting a machine tool, multi-digital switches Da, Db, Dc and Dd in the work coder D are to be set to indicate the type of work and that the machining switch 3 is to be subsequently closed. It will be recalled that this closure of switch 3 lowers the high-level voltage being applied to AND-type network gate 7 by grounding through the closed contacts in switches Da, Db, Dc and Dd and through said switch 3, thereby raising the potential of the inputs of corresponding RS flip-flops among the group comprising E–1 through E–16 and causing these corresponding flip-flops to issue high-level output signals, which apply to the "1" input of gates G. As commencement-of-machining pulse P11, generated by the gate control pulse generator F, is subsequently transmitted by conductor wire 11 to respective gates C and gates G, these gates open to pass to memory H the coded data representing the commencement of machining, machine tool number and part type number. Consequently, the complete data, composed of signals S1 through S43, for one machine tool apply to the "1" inputs of two-input AND gates 10–1 through 10–43.

In the above sequence of events, the commencement-of-maching pulse 11, which emerges from said one-shot vibrator F–1, is transmitted also to delay circuit I. This circuit retards the pulse long enough to cover the time required for signals S1 through S43 to go into store in memory H and then come out to apply to the "I" inputs of said two-input AND gates 10–1 through 10–43. The delay time can be adjusted by varying the values of the resistor and capacitor connected to the delay circuit. Adjustment is to be effected at the external control panel, not shown.

In FIG. 6, clock pulses P15, generated by clock J–1, are led by conductor wire 15 to binary counter J–2. Pulses P15 are synchronized to the punching speed of punch device L under control from the external control panel. By these pulses, binary counter J–2 performs its counting action. Binary-octal decoder J–3 is actuated by pulses P15. Decoder J–3 is used as an eight-state decoder, whose outputs are eight in number. One of its inputs is an inhibit input connected to the output of flip-flop J–7, so that, when the said commencement-of-machining pulse 11 is absent, the output of flip-flop J–7 remains at high level and hence prevents decoder J–3 from operating.

Now, as pulse P11 occurs and, after passing through delay circuit I, arrives at "set" input of flip-flop J–7, the output potential of J–7 reverses its polarity, thereby releasing binary-octal decoder J–3 from an inoperative condition and making it start working. Upon coming out of delay circuit I, pulse P11 is transmitted also to binary counter J–2 to clear this counter, making it start counting from "0" upward. As will be noted later, the completion-of-machining pulse P12 also clears counter J–2, thus ensuring the counting action free from error.

Binary counter J–2 and binary-octal decoder J–3 are set into operation in the above-mentioned manner by commencement-of-machining pulse P11 and clock pulses P15.

Binary-octal decoder J–3 has a total of eight outputs, as will be noted in FIG. 6. Two of these outputs are in use while the remaining six are left open. Output signal P13 flows in conductor wire 13 and reaches the "1" inputs of binary counter J–5 and of AND gates K–13 through K–18. These AND gates produce output signals when they receive pulse signal P13 and output signals of said RS flip-flops K–7 through K–12. The output signals so produced apply to punch device L, wherein the signals energize respective pin coils to effect punching action.

Pulse signal P13 goes also to binary counter J–5, which counts the signal and forwards the counted signal to decoder J–6. From decoder J–6, output pulses "0" through "12" and clear pulse "2" come out sequentially. Decoder J–6 is a 14-state decoder which comprises two decoder elements connected together, each being similar to decoder J–3 in construction and function. The scanning action will be described next.

When data, composed of 43-bit signals S1 through S43, are absent in memory H, there is no need of scanning and, by the same token, binary-octal decoder J–3 need not operate. For this reason, flip-flop J–7 is provided, as has been explained, in order to keep a high-level signal applied to the inhibit input of J–3. Until output signal P13 issues forth from binary-octal decoder J–3, binary counter J–5 does not start counting and decoder J–6 will till then be giving only output pulse "0" from its "0" output, which is marked uppermost in the circuit symbol in FIG. 6. In short, output pulse "0" is always issuing forth from decoder J–6 as long as this decoder is not counting.

Under the conditions mentioned above, suppose that data signals S1 through S43 come from the outputs of memory H and arrive in parallel at the inputs of AND gates 10–1 through 10–43. Then signals S1 and S2 apply to the "set" inputs of RS flip-flops K–7 and K–8 by way of multi-input OR gates K–1 and K–2, because of the output pulse "0" applying from J–6 to the two-input AND gates 10–1 and 10–2. These signals, S1 and S2, apply also to parity-check decoder K–5. Consequently, the potential of the "set" inputs of K–7 and K–8 rises and, at the same time, decoder K–5 gives out pulse 17 by way of OR gate K–6. Pulse 17, so introduced, raises the potential of the "set" input of RS flip-flop K–12. It must be noted here that, in the present instance, the first word to be punched is digit "1," as shown in FIGS. 8, 9, 10 and 11 and as will be explained later, and that signal S2 is presently at low level, that is, absent. Decoder K–5, therefore, receives only one signal, the signal from K–1, and therefore does not produce parity-check pulse 17. For the particular situation being considered in reference to the attached drawings, there is no need of adding "1" for parity check at this juncture. The sequence of events leading to punching of a hole in the tape for the first word "1" is as follows:

While output pulse "0" is being supplied by decoder J–6, commencement-of-machining pulse 11 will arrive at the "set" input of flip-flop J–7 after some delay due to the action of delay circuit I, the extent of the delay being sufficient to cover the time required for the data to shift as described above. By pulse 11, the output potential of flip-flop J–7 falls, so that binary-octal decoder J–3 starts counting. At the same time, a train of regularly spaced pulses P15 begins to apply to binary counter J–2 and thereafter keeps this counter feeding its output signal to the inputs of binary-octal decoder J–3. From the outputs of J–3, pulses issue forth sequentially. Of these output pulses, pulse P13 applies in parallel to binary counter J–5 and AND gates K–13 through K–18. Thereupon, gate K–13, whose "set" input is already up to high level with signal S1, opens to send out an output signal to punch device L, thereby energizing the corresponding pin coil to effect a punching action at a position signifying digit "1" in the tape, as shown in FIGS. 8, 9, 10 and 11.

Concurrent with the above events resulting in a punching action, pulse P13 enters decoder J–6 from J–5, causing an output pulse to emerge from output "1" of decoder J–6. This pulse applies in parallel to four AND gates 10–3, 10–4, 10–5 and 10–6 for S3, S4, S5 and S6 to indicate the next word. In the present instance, the next word is digit "9," for which the signals are S3 and S6, so that the gates that open are 10–3 and 10–6. Output signals from these gates apply subsequently to multi-input OR gates K–1 and K–4. Because pulses P15 from clock J–1 are synchronized with the speed of punch device L, pulse 14 from decoder J–3 applies in parallel, just when the above-mentioned punching of digit "1" has been completed, to "reset" inputs of RS flip-flops K–7 through K–12, thus erasing the digit "1" in memory by clearing this group of flip-flops.

The cleared RS flip-flops K–7 through K–12 are now ready to receive the next group of signals, S3 and S6, for the digit "9" mentioned above. These two signals go to flip-flops K–7 and K–10 and also to decoder K–5, causing this decoder to issue a parity-check pulse 17, which goes to K–12. As a result, three flip-flops, K–7, K–10 and K–12, receive signals, and their corresponding AND gates K–13, K–16 and K–18 become ready to energize their pin coils in punch device L. Then, another pulse 13 from binary-octal decoder J–3 arrives at these AND gates and open them to effect a punching action, as described before, and thus register digit "9" and parity-check bit in the tape. The same pulse P13 goes also to decoder J–6, causing this decoder to issue the next or third signal from its output "2" for triggering the subsequent group of AND gates 10–7 and 10–8.

Sequential scanning continues, one word at a time, in the foregoing manner as output pulse P13 applies intermittently and regularly to binary counter J–5 and by discriminating the number of output signal combinations supplied by J–5 to produce 13 discrete output signals sequentially by means of J–6, each output signal of J–6 being used to open a group of AND gates corresponding to one word among gates 10–1 through 10–43. As was stated previously, these AND gates handle 43 bits, whose signals are numbered S1 through S43 to constitute 13 words, namely, two words for the date, two words for the hour, one word for the machine number, two words for the work or part type, one word for the cause of idling and, finally, one word for discriminating between the commencement and the completion of machining.

In other words, the data formed with 43 bits come simultaneously to AND gates 10–1 through 10–43, and the data are then forwarded piecemeal therefrom, one word at a time, by the action of 13 pulses "0" through "12" issuing forth sequentially from decoder J–6. Upon scanning the 13th word and punching it in the tape, the 14th signal designated as "Z," appears from decoder J–6 to clear binary counter J–5 and memory H and to invert flip-flop J–7. The cleared J–5 starts counting again from "0" upward when the next data arrive.

Figure 8:
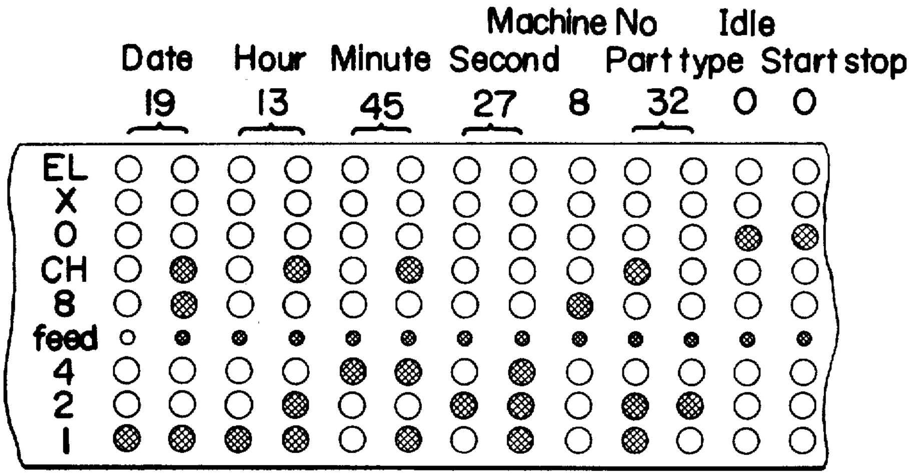
Figure 9:
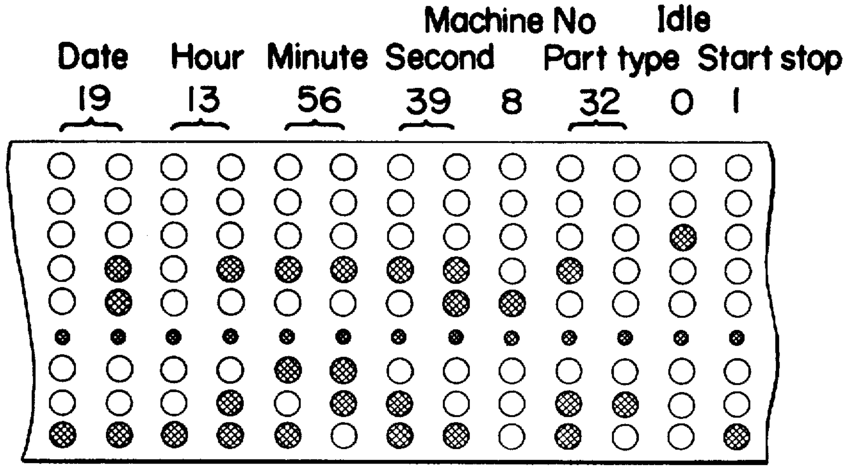
Figure 10:
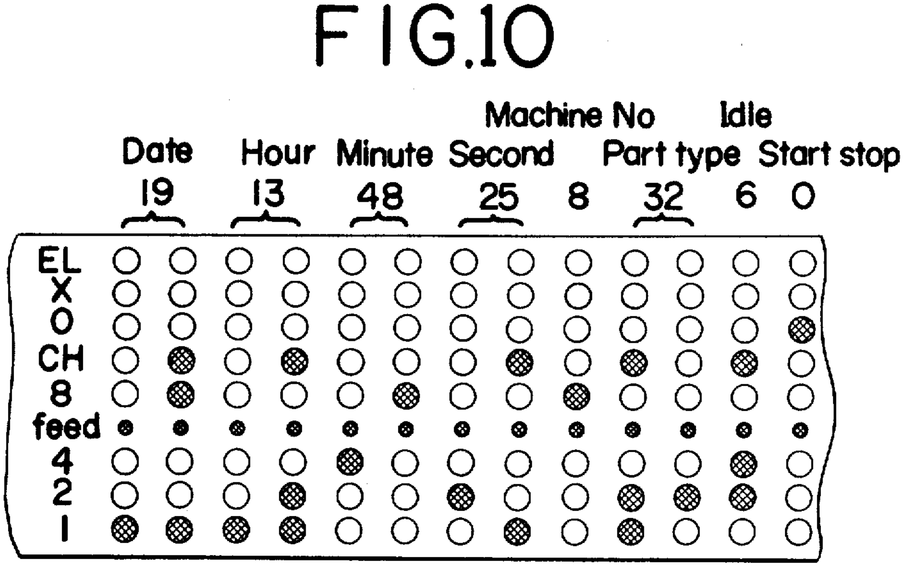

How signal "Z" works will be explained by referring to FIG. 6. RS flip-flops H–1 through H–43 of memory H have their "reset" inputs connected to the 13th output terminal of decoder J–6, so that the occurrence of signal "Z" will at once reset all these RS flip-flops, thereby erasing the data that have arrived simultaneously. With signal "Z" entering the "reset" input of flip-flop J–7, the output of this flip-flop turns to high level to inhibit the operation of binary-octal decoder J–3. FIG. 8 shows an example of tape P punched in the foregoing manner to form a record for the initial stage of the machining operation.

Referring to FIGS. 8, 9, 10 and 11, the punched tape P will be explained. The tape is of the known eight-channel type, each column for one word, there being eight possible punching positions, which are identified as "EL" (for the end of a line to mark the end of the day's recording, for example), "X" (for indicating the negative sign of a numeric value punched in the column—this position is not used in the system according to this invention), "0," "CH" (for the parity-check bit), "8" (for weight 8), "feed," "4" (for weight 4), "2" (for weight 2) and "1" for (weight 1). The tape takes in, in the form of punched holes, the time codes for the commencement and the completion of a machining operation, the beginning and the ending of a cause of idling, and the work codes for the machine number, part type number and cause of idling. The time codes are formed with two bits for the date, two bits for the hour, two bits for the minute and two bits for the second. The work codes are formed with one bit for the machine number, two bits for the part type number, one bit for the cause of idling, and one bit for discriminating between the commencement and the completion of the operation and also between the beginning and the ending of the cause of idling, there being a total of 13 words, which are shown in the above order from left to right on the tape. The punched holes are shown as hatched in the drawings.

The sequence of events taking place after a machining operation, as recorded in the tape P of FIG. 8, has been completed, will be considered. Suppose that, upon completion, machining switch 3, shown in FIG. 4, is opened. This restores +5 volts to Vcc of AND-type network gate 7, so that this network returns to high-level condition, raising conductor wires 27 through 42 to high level. Thus, low-level signals S27 through S42 apply from inverters 8–1 through 8–16 to the RS flip-flops of memory E, in which said data are still retained. AND-type network gate 7, upon returning to high-level condition, emits a high-level pulse signal from its output, as will be noted in FIG. 5, to one-shot vibrator F–1 and inverter F–3. F–1 does not operate with a high-level input pulse but F–3 forwards a low-level pulse signal to one-shot vibrator F–2 to actuate this vibrator to produce an output pulse, which applies to OR gate F–4 on the one hand and, as pulse 12, to RS flip-flop H–43 on the other hand. The resultant output pulse P11 of OR gate F–4 applies in parallel, just as when a machining operation is commenced, to "1" inputs of gates C–1 through C–26 and of gates G–1 through G–16.

By pulse P11, these gates open to forward the two sets of data held in memory E to memory H in a manner similar to the shifting of data at the time of commencing a machining operation. One set is the completion-of-machining data originating in time code generator B; the other is the data that had been held in memory E. Completion-of-machining pulse P12 applying to "set" input of RS flip-flop H–43 raises this flip-flop to high level, thus storing the completion-of-machining data therein.

It will be seen from the foregoing description that, when a machining operation has been completed, there will be stored in memory H the 43-bit completion data for one machine tool. These 43-bit data are similarly supplied to "1" inputs of AND gates 10–1 through 10–43, and the sequentially scanned in the same manner that has already been explained for the commencement of a machining operation. To recapitulate, the 13-word data in 43 bits are supplied simultaneously to memory H and AND gates 10–1 through 10–43, and subsequently forwarded one word at a time toward punch device L. The 13th word is for discriminating between the completion and the commencement of a machining operation: it emerges from the output of AND gate 10–43. The output signal of 10–43 is branched off and forwarded, as the "clear" pulse signal 1, back to "reset" inputs of RS flip-flops E–1 through E–16 of memory E, thereby erasing the data stored in this memory. Device L punches the 13 words in much the same way as it did the 13 words for the commencement of a machining operation, and will produce a punched record, which is represented by the tape P in FIG. 9.

Thus far, the processes of recording the data for the commencement and completion of a machining operation have been explained for one machine tool handling certain work. In the following, interruption of the machining operation will be considered to explain how such stoppage is recorded by the system according to this invention. Accurately recording each stoppage is necessary for providing recorded data comprehensive enough to compute the real machining cost. For the cause of stoppage or idling, a number of cases can be thought. A worn cutting tool must be replaced, and such replacement involves an interruption. Let this cause be designated as B.C.D. digit "6," which is to be coded by means of multi-digital switch D. (In the present instance, a total of nine causes of idling can be accommodated, the tool replacement being the sixth cause.) After setting the switch D to code "6," machining switch 3 is to be opened first and stop switch 4 is to be closed next. Switch D may be set before switch 3 is opened. In either case, as switch 3 is opened, the sequence of events leading to the transfer of the data to the tape in a manner already described takes place. In other words the data at the time of stopping the machining operation become recorded on the tape. As switch 4 is subsequently closed, the high-level voltage applying to AND-type network gate 7 becomes grounded through contacts Da–4, Db–2, Dd–3, diode 6 and stop switch 4, because contacts Da–4, Db–1, Db–2, Dc–2, Dd–2 and Dd–3 have been in closed condition. As a result, RS flip-flops E–4, E–14 and E–15 change to high level because of inverters 8–4, 8–14 and 8–15, whereby the machine tool number "7" and the cause of idling "6" go into memory.

However, the part type number does not go into memory under this condition because low-level signal applies to the RS flip-flops E–5, E–6 and E–10 for holding the part type number code in the present instance. The reasons are that contacts Db–1, Db–2 and Dc–2 closed to code that number are connected to switch 3, and that these RS flip-flops, corresponding to the closed contacts in multi-digital switches Db and Dc, were reset by the completion-of-machining pulse P12 subsequent to the opening of switch 3 as mentioned above. This fact needs to be taken into account in preparing the source program tape to be placed in the electronic computer and, where the program is adapted properly, does not present any problem.

The above-mentioned switch manipulation turns the output of AND-type network gate 7 to low level. As in the case of the commencement of a machining operation, one-shot vibrator F–1 issues forth a positive pulse, which proceeds as pulse P11 by way of OR gate F–4 to gates C–1 through C–26, so that the codes for the beginning of a cause of idling, the machine tool number and the cause of idling move through successive stages in the same manner as for the commencement of a machining operation and become punched ultimately into the tape in device L. The resultant record is shown in the tape P of FIG. 10. After replacing the worn cutting tool, stopping switch 4 is to be opened and machining switch 3 is to be closed again. The opening of stopping switch 4 restores AND-type network gate 7 to its ungrounded condition, as has been explained relative to the completion of a machining operation, to cause one-shot vibrator F–2 to issue forth a positive pulse, which then induces a shifting forward of data to device L, resulting in a record shown in the tape P of FIG. 11.

The above-mentioned pulse from F–2 is pulse P12. This pulse raises "set" input of RS flip-flop H–43, whose output signal enters AND gate 10–43. The output signal of gate 10–43 branches off and applies in parallel, as the "clear" pulse 1, to "reset" inputs of RS flip-flops E–1 through E–16 of memory E and erases this memory, just as in the case of the completion of a machining operation. The sequence of events following the above-mentioned closure of machining switch 3 is the same as that already explained for the commencement of a machining operation.

With a new cutting tool set in place, the cause "6" of idling no longer exists. Contacts Dd–2 and Dd–3 (for "6") in multi-digital switch Dd are in closed condition. They may be opened at any time after switch 4 is opened, but must be opened when another cause of idling occurs to necessitate the use of switch Dd to code it. Having thus re-started the machining operation by closing switch 3 and opening switch 4, the machinist proceeds to complete the operation. Upon completion, he opens machining switch 3 again, and this results in another punched record similar to the one shown in FIG. 9. The foregoing processes of recording are to be repeated to produce a continuous punched tape carrying the machining operation data accurately reflecting stoppages, if any. With the source program adapted to take into account the idling time, such stoppages do not interfere with computation of the more realistic machining cost for each work.

Up to now, the system according to the invention has been described on the basis of one machine tool, but the description applies also to the case in which a plurality of machine tools are served by the system. Referring to FIG. 3, oscillator A and time code generator B are common to a plurality of machine tools M1, M2, . . . M*n*. Note that the time codes are supplied in parallel to gate circuits C1, C2, . . . C*n*. If *n* number of machine tools start machining at the same time, the commencement-of-machining pulse will simultaneously emerge from gate-control pulse generators F1 through F*n*. Since time codes are supplied in parallel to gates C1 through C*n*, as mentioned above, these gates send the coded time data into memory circuits H1 through H*n* upon arrival of said pulse. Gates G1 through G*n* are similarly actuated by said pulse to shift the coded work data from memory circuits E1 through E*n* to memory circuits H. Thus, memory circuits H1 through H*n* simultaneously take in the coded data for their respective machine tools and, thereafter, are sequentially scanned. This scanning refers to a series of memory circuits, and is distinct from the scanning effected, as described in reference to FIG. 6, on the contents of a memory circuit H. The sequential scanning of the momery circuits, H1 through H*n*, will be explained in greater detail.

Referring to FIG. 7, H1 though H*n* are memory circuits, each corresponding to a machine tool indicated with a like subscript numeral; 30–1 though 30–*n* are each composed of 43 two-input AND gates; 31 is a 43-input NOR gate; 32 is a memory circuit; 33 is a counter, which counts the pulses Z coming from the 14th output of decoder J–1 and also the pulses from 43-input NOR gate 31; 34 is a decoder, which receives "*n*+1" number of B.C.D. codes from said counter 33 and issues forth one output signal corresponding to one of the "*n*+1" codes. The "1" in "*n*+1" means that the *n*th pulse "clears" counter 33, flip-flop J-7 and memory circuit H*n*, as will be explained later.

When memory circuits H1 through H*n* have not yet taken in the data, decoder 34 is generating output pulses PO, which appear from the leftmost output terminal in FIG. 7. This pulse PO flows in conductor wire O and applies to AND-gate circuit 30–1. As the data for respective machine tools enter memory circuit H1 through H*n*, the pulse PO actuates AND-gate circuit 30–1 to shift the data contents of memory H1 to memory 32. The output signals from gate 30–1 are branched off, before entering said memory 32, to go to NOR gate 31. No output signal appears from NOR gate 31 because of its input negating action. At this time, memory 32 is given the data only for machine tool M1. These data in memory 32 are then sequentially scanned by means of 13 pulses coming from outputs 0 through 12 of decoder J–6 in the same manner as has been described before, to release 13-word data for punching in the tape P.

Upon completing the data punching for machine tool M1, output pulses Z from the 14th output of decoder J–6 enter counter 33, which counts these pulses and feeds the result of counting to decoder 34, causing this decoder to issue forth output pulse P1.

Concurrent to the generation of pulse P1, the pulse Z applies to binary counter J–5 and to memory 32 to clear these devices. Said pulse P1 applies to and actuates AND-gate circuit 30–2 to shift the data contents of its memory H2 to memory 32 for the same sequential scanning as above.

The same pulse P1 is branched off, before entering said circuit 30–2, to memory H1 and clears this memory. Conductor wire 1, through which pulse P1 is transmitted, is connected also to "reset" inputs of RS flip-flops in memory H1. Upon completing the data punching for machine tool M2, another output pulse Z occurs and, through counter 33, goes to decoder 34, so that pulse P2 emerges and, through conductor wire 2, goes to AND-gate circuit 30–3 and also to memory H2, to repeat the process mentioned above.

The "*n*+1" number of different output signals are sequentially produced by decoder 34. Of these pulse signals, pulse PO, the first one, is the only one that is supplied to a single device, namely, AND-gate circuit 30–1, whereas each of the subsequent output pulses, P1 and upward, is supplied to two devices, an AND-gate circuit and the memory H preceding this circuit, to serve the same purpose as that of pulse P1 explained above. The last *n*th pulse, therefore, serves only to clear memory H*n*, counter 33 and flip-flop J–7. Upon receiving this *n*th pulse, flip-flop J-7 reverses its polarity, producting a high-level output signal, thereby inhibiting the operation of binary-octal decoder J–3.

To summarize, for *n* number of machine tools, counter 33 and decoder 34 are operated to sequentially scan the corresponding number of memory circuits H1 through H*n* to transfer their data contents to memory 32, one set of data at a time. The last AND-gate circuit 30–*n* is actuated by the "*n* minus 1"th pulse from decoder 34.

It has been assumed thus far that all memory circuits H1 through H*n* receive coded data. The case of some of these memory circuits not receiving data will be considered here by assuming that all but memory H2 get data. In this assumed case, it will be seen that AND-gate circuit 30–2 will not operate upon arrival of pulse P1, so that there will be no output signal from this circuit. But 43-input NOR gate 31 issues an output pulse, which goes to counter J–33, as shown in FIG. 7, to initiate issuance of the next pulse P3 from decoder 34, thus enabling the sequential scanning to continue and cover the remaining memory circuits H3 through H*n*.

The system according to this invention has been explained in the above for general machine tools, but the invention is equally effective for numerically-controlled (N/C) machine tools, as will be noted in the following description referring to FIGS. 2, 4 and 5.

Referring first to FIG. 2, an N/C control tape *y* and code-forming multi-digital switch D are to be used to handle the data and put them in memory E for one N/C machine tool. Referring next to FIG. 5, additional parts are used in the system involving N/C machine tools; these are contacts 19 and 20, which are to be switched to conductors 21 and 22, respectively, thereby blocking the pulses coming from one-shot vibrators F–1 and F–2 and otherwise reaching gates C–1 through C–26 and gates G–1 through G–16.

Conductor 21, as will be mentioned later, transmits the commencement-of-machining signal issuing forth from the tape reader of the numerical controller, not shown. This signal is transmitted to the above-mentioned gates. Conductor 22 transmits the completion-of-machining signal, which applies to RS flip-flop H–43 and, through diode 23, to said gates. Control tape *y* is to be recorded in advance with the codes for the part type number and others; and multi-digital switch D is to be used to code the machine tool number and the cause of idling.

Specifically stated, tape *y* is to carry the codes for the applicable part type number, the commencement, the machining program for that part type, and, finally, the completion of a machining operation, in that order. Obviously, the electrical circuitry for signal transmission is to be so arranged that tape *y* and tape reader will cooperate to supply the commencement and completion signals and part type number signal to the system of this invention and the machining program to the N/C machine tool, and that the commencement signal will be fed into conductor 21, the completion signal into conductor 22, and the part type number signal to "set" inputs of specific RS flip-flops of said memory E in order to store the part type number therein.

How N/C machine tools are to be served by the system of this invention will be explained in detail in reference to FIG. 4, by assuming No. 7 machine tool cutting work with a part type number of, say, 63. In this assumed case, contacts D*a*–1, D*a*–2 and D*a*–3 (for "7" ) will be closed in multi-digital switch D*a*. An N/C tape *y*, carrying the machining program for part type number 63, is loaded into the tape reader of the controller. Now, machining switch 3 is closed; this affects the voltage applying to AND-type network gate 7, as already explained, to place these coded data in RS flip-flops E–1, E–2 and E–3 of memory E. At the same time, the tape reader picks up the part type number from tape *y* and supplies this number in the form of B.C.D. "63" to memory E by raising RS flip-flops E–6 and E–7 (for "6"), E–9 and E–10 (for "3") to high level.

As the commencement signal arrives from the tape reader via conductor 21 at gates C–1 through C–26 and gates G–1 through G–26, all the coded data, namely, time codes for commencement and work codes comprising the machine tool number and part type number go into memory H, as in the case of general machine tools, and, by the same sequential actions already explained, become punched into the tape P to provide a record for the commencement of a machining operation. Thereafter, the machine tool cuts the work under numerical control.

Upon completion of the automatic cutting, the tape reader reads the completion code off tape *y* and applies this code signal by way of conductor 22 to "set" input of RS flip-flop 43 and, via diode 23, to gates C–1 through C–26 and gates G–1 through G–16, thereby shifting all the completion-of-machining data from memory E to memory H. Thereupon, sequential scanning and subsequent punching take place, as before, to produce another record in the tape P for the completion of this machining operation. A signal applies from RS flip-flop 43 to AND gate 10–43, whose output signal divides into two, one of which erases memory E, as in the case of general machine tools.

It is obvious that the codes for causes of idling cannot be pre-recorded in tape *y* because the causes of idling occur unexpectedly in most cases even where the machine tools are numerically controlled. Thus, multi-digital switch D is to be used to indicate each cause. This will be explained by assuming the replacement of a worn cutting tool as cause "6". When such replacement is necessitated while a machining operation is in progress, multi-digital switch D is to be set for "6," and the controller is to be shut down to stop the machine tool. Then, the machinist switches contacts 19 and 20, shown in FIG. 5, back to the positions indicated, opens machining switch 3, and closes switch 4, in that order. The opening of switch 3 causes one-shot vibrator F–2 to give a pulse from its output. This pulse signal divides into two, one going as pulse P11 by way of contact 19 to gates C–1 through C–26 and gates G–1 through G–16, and the other going as pulse P12 by way of contact 20 to RS flip-flop H–43. As in the case of general machine tools, the output pulse of this flip-flop becomes branched off by AND gate 10–43 to apply to memory E and erase this memory.

Figure 11:
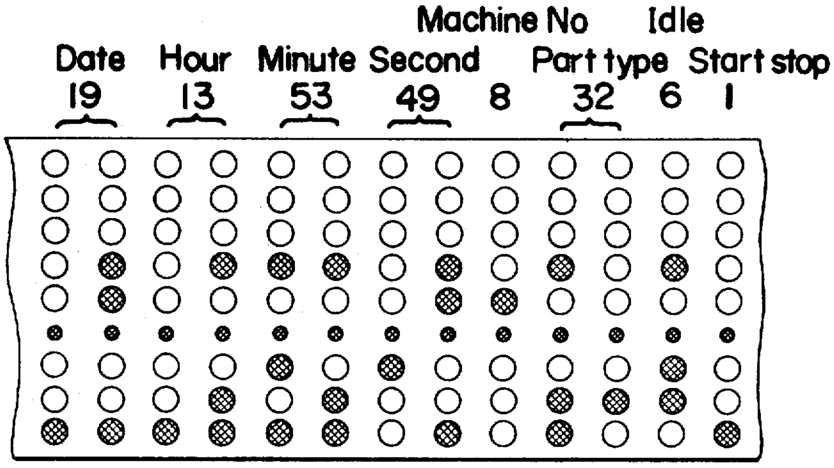

The closure, mentioned above, of stopping switch 4 causes one-shot vibrator F–1 to issue pulse P11, which actuates gates C–1 through C–26 and gates G–1 through G–16 to shift into memory H the coded data for the beginning of idling, machine tool number and cause of idling, to result ultimately in a punched record for the beginning of idling, similar to the one shown in FIG. 11. After the cutting tool has been replaced, switch 4 is to be opened, and this will result in another punched record for the ending of idling, similar to the one shown in FIG. 12. Then, closing switch 3 and connecting back contacts 19 and 20 to conductors 21 and 22 will re-start the controller to resume the machining operation. When the work has been finished in the machine tool, the tape reader picks up the completion code and, as in the previous case, issues forth a signal, which gives rise to formation of a punched record for the completion of the machining operation. Thus, where N/C machine tools are served by the system, N/C tape *y* needs to be programmed to account for the records of idling time made in the tape P, so that the real machining cost can be correctly computed.

From the foregoing detailed description, it will be understood that the system according to this invention is applicable not only to general-type machine tools and industrial production machines but also to N/C or otherwise controlled machine tools, and provides, with a minimum of labor, directly usable data out of records of the machining performance. According to the invention, there is no need for the machinists to write into job sheets the basic data such as the type of work, operating time, etc., so that the machinists are freed from these extra manual steps and allowed to concentrate their attention fully on machining. Moreover, gathering job sheets at regular intervals, using key-punchers to punch the basic data into cards, processing the data in punched cards to obtain the desired information, and charging one or more specific persons with the task of data processing, all of which are involved in the method hitherto practiced, are altogether eliminated to engender a considerable advantage also in the area of labor control.

According to this invention, the punched tape can be used in any electronic computer, provided that the coding system of the tape is the same as that of the tape reader of the computer, and the tape, in which all the records are concentrated, can be used any time as desired to turn out the desired information. The quantity of the tape consumed is small because recording thereon is effected only when a machining operation is commenced, stopped for idling due to some cause, restarted after the cause is eliminated, and completed.

Since the data are handled in the form of digital signals from beginning to end, there being no analog signals of any kind, such errors as are caused by voltage variations are absent in the system according to the invention. The system can be put in service wherever there are one or more machine tools or the like and an electronic computer, and can be utilized in any field of industry. This invention provides a means of accurately reporting the various computed data, immediately after completion of each machining job, through the analysis and processing of basic data that have hitherto required much time to perform, makes it possible to analyze a large quantity of data, frees humans from the task of complicated data processing, and contributes substantially to rationalization of production processes and control thereof. It will be recognized that this invention will prove useful in the various fields of industry where the trend is now toward higher productivity and greater labor saving.

What is claimed is:

1. Apparatus for producing a punched tape record to be fed to a computer for automatically and centrally computing the efficiency of machining performance for a plurality of machine tools, comprising a time code generator receiving clock pulses and converting said pulses into time data expressed in terms of binary-coded-decimal digits; first memory devices, one for each machine tool, for memorizing binary-coded-decimal-digit data concerning the machine tool; second memory devices, one for each machine tool; a gate device for transferring, in response to a pulse signifying the commencement or the completion of a machining operation or the beginning or the ending of an idling time, said binary-coded-decimal-digit time data and the memory contents of the first memory devices into the second memory devices for each machine tool; and means for sequentially scanning the memory contents of each of the second memory devices at a speed synchronized with the punching speed of a punch device, to which the sequentially scanned memory contents of the second memory devices are passed and by which the memory contents are punched into a tape.

* * * * *